(12) United States Patent
Stöckl et al.

(10) Patent No.: US 11,525,499 B2
(45) Date of Patent: Dec. 13, 2022

(54) DRIVETRAIN FOR A MOTOR VEHICLE

(71) Applicant: AVL COMMERCIAL DRIVELINE & TRACTOR ENGINEERING, Steyr (AT)

(72) Inventors: Dieter Stöckl, Steyr (AT); Josef Häglsperger, Gangkofen (DE)

(73) Assignee: AVL LIST GMBH, Graz (AT)

( * ) Notice: Subject to any disclaimer, the term of this patent is extended or adjusted under 35 U.S.C. 154(b) by 0 days.

(21) Appl. No.: 17/293,133

(22) PCT Filed: Nov. 7, 2019

(86) PCT No.: PCT/AT2019/060378
§ 371 (c)(1),
(2) Date: May 12, 2021

(87) PCT Pub. No.: WO2020/097650
PCT Pub. Date: May 22, 2020

(65) Prior Publication Data
US 2022/0010868 A1 Jan. 13, 2022

(30) Foreign Application Priority Data
Nov. 13, 2018 (AT) .............................. A 50988/2018

(51) Int. Cl.
*F16H 47/04* (2006.01)
*B60K 6/24* (2007.10)
(Continued)

(52) U.S. Cl.
CPC ............... *F16H 47/04* (2013.01); *B60K 6/24* (2013.01); *B60K 6/365* (2013.01); *B60K 6/38* (2013.01);
(Continued)

(58) Field of Classification Search
None
See application file for complete search history.

(56) References Cited

U.S. PATENT DOCUMENTS 3,398,605 A * 8/1968 Ainsworth ............. B62D 11/18
475/74
7,951,033 B2 * 5/2011 Abe ......................... B60K 6/48
475/5
(Continued)

FOREIGN PATENT DOCUMENTS

DE 19954894 A1 12/2000
DE 102011077089 A1 12/2012
(Continued)

*Primary Examiner* — Dirk Wright
(74) *Attorney, Agent, or Firm* — Dykema Gossett PLLC

(57) ABSTRACT

Various embodiments of the present disclosure are directed to a drivetrain. In one example embodiment, a motor vehicle drivetrain is disclosed including a transmission arrangement for a motor vehicle with a primary engine. The transmission arrangement including a transmission input shaft which can be connected to the primary engine, and at least one transmission output shaft. The at least one transmission output shaft including a first summation planetary gear unit having primary and secondary first transmission input elements, and a first transmission output element, and a second summation planetary gear unit having primary and secondary second transmission input elements and a second transmission output element. The first transmission output element is connectable to the transmission output shaft via at least one first clutch and the second transmission output element is connectable to the transmission output shaft via at least one second clutch.

26 Claims, 6 Drawing Sheets

(51) Int. Cl.
*B60K 6/365* (2007.10)
*B60K 6/38* (2007.10)
*F16H 3/72* (2006.01)

(52) U.S. Cl.
CPC ............ *F16H 3/72* (2013.01); *B60Y 2200/80* (2013.01); *B60Y 2200/92* (2013.01); *B60Y 2400/73* (2013.01); *F16H 2200/2007* (2013.01)

(56) References Cited

U.S. PATENT DOCUMENTS

2008/0269000 A1\* 10/2008 Abe ................ B60W 20/40
475/205
2011/0130235 A1\* 6/2011 Phillips ................ B60K 6/365
475/5

FOREIGN PATENT DOCUMENTS

| | | | | |
|---|---|---|---|---|
| DE | 102012213224 A1 | 1/2014 | | |
| DE | 102014205039 A1 | 9/2015 | | |
| DE | 102015220635 A1 \* | 5/2016 | ............ | B60K 6/12 |
| EP | 0081696 A1 \* | 6/1983 | | |
| EP | 0050633 B1 \* | 5/1988 | | |
| EP | 0521195 A1 \* | 1/1993 | | |
| RU | 2191303 C2 | 10/2002 | | |
| WO | WO-0043695 A2 \* | 7/2000 | ........... | F16H 37/084 |
| WO | WO-2011138892 A1 \* | 11/2011 | ............. | B60K 6/365 |
| WO | WO-2012008884 A1 \* | 1/2012 | ............. | E02F 9/202 |

\* cited by examiner

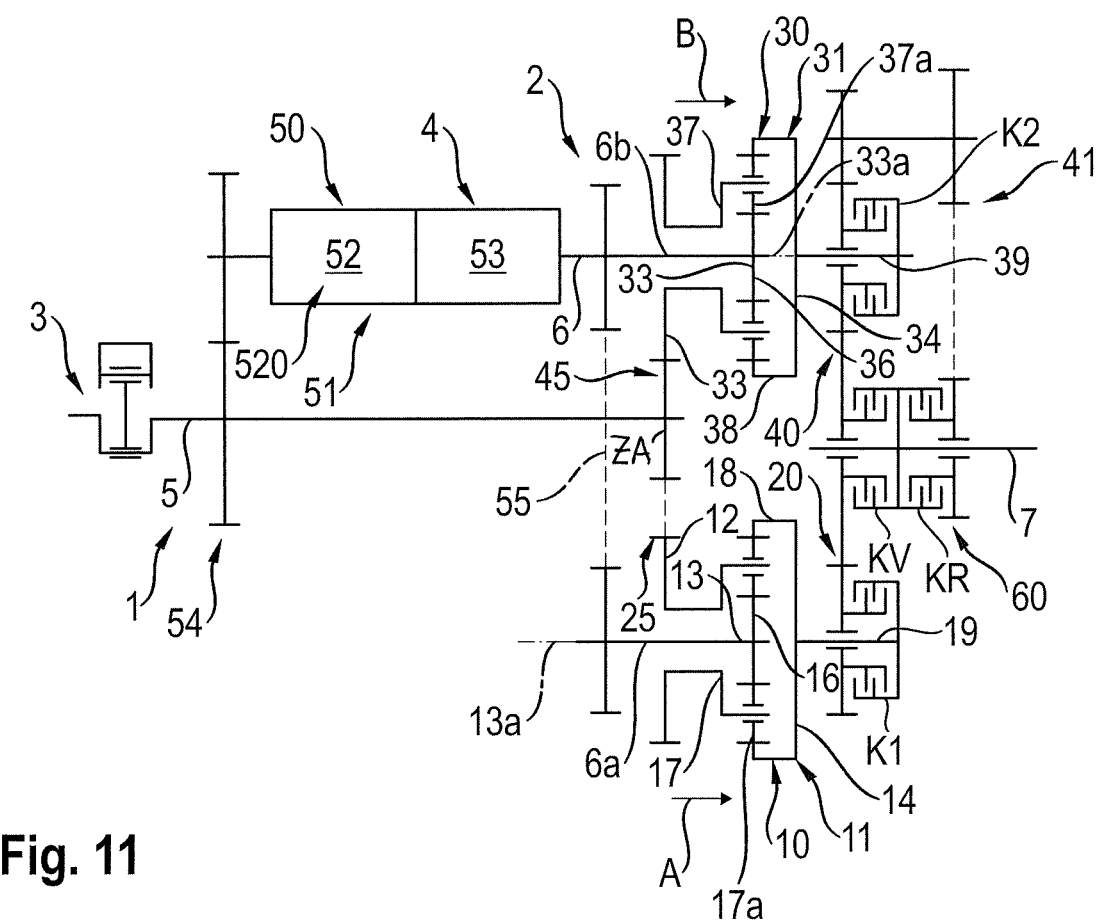
Fig. 11
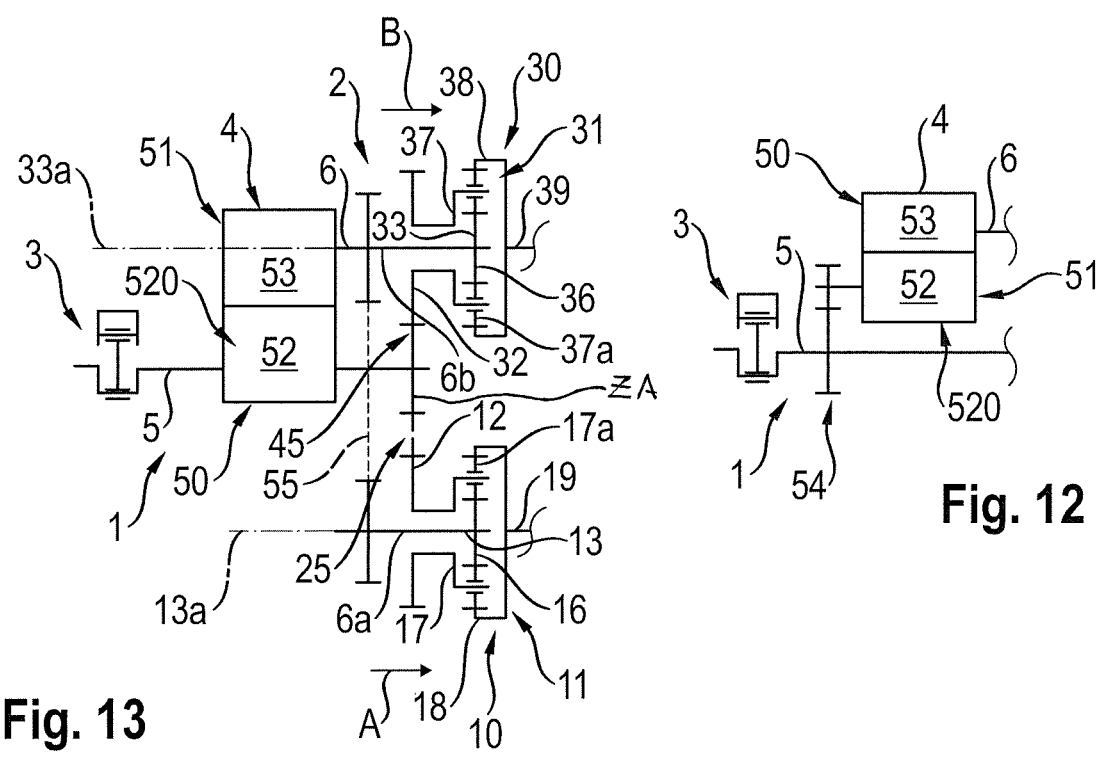
Fig. 13
Fig. 12

DRIVETRAIN FOR A MOTOR VEHICLE

CROSS-REFERENCE TO RELATED APPLICATIONS

This application is a national stage filing based upon International application No. PCT/AT2019/060378, filed 7 Nov. 2019, which claims the benefit of priority to Austria application No. A 50988/2018, filed 13 Nov. 2018.

BACKGROUND

The invention relates to a drivetrain for a motor vehicle comprising a transmission arrangement having a primary engine, in particular an internal combustion engine, comprising a transmission input shaft connectable or connected to the primary engine and at least one transmission output shaft, comprising a, preferably triple-shaft, first summation planetary gear having two first transmission input elements and a first transmission output element, and a, preferably triple-shaft, second summation planetary gear having two second transmission input elements and a second transmission output element, wherein a primary first transmission input element of the first summation planetary gear and a primary second transmission input element of the second summation planetary gear are mechanically connected to the primary transmission input shaft, and wherein a secondary first transmission input element of the first summation planetary gear and a secondary second transmission element of the second summation planetary gear are connected or connectable to at least one secondary engine.

DE 10 2012 213 224 A1 describes a transmission having a power-split continuously variable transmission section with a mechanical power branch with continuously variable speed. A planetary gear set can be connected to the mechanical power branch and/or the power branch with infinitely variable speed, with a partial gear unit being connected downstream of the planetary gear set and operatively connected to it. The power branch with continuously variable speed can be connected to an input element of the planetary gear set via a shifting element and can be decoupled from the latter, wherein an input element of the planetary gear set is connected to the mechanical power branch and the planetary gear set is locked in a state in which the planetary gear set is decoupled from the power branch with continuously variable speed.

DE 10 2011 077 089 A1 discloses a transmission device having a transmission input shaft that can be coupled to an engine of a vehicle drivetrain and a transmission output shaft that can be connected to an output of a vehicle drivetrain. A power take-off shaft can be coupled to the transmission output shaft via a switchable connection device. The transmission device has a continuously variable power-split transmission section. The transmission output shaft can be coupled to an output of a vehicle drivetrain via a connecting device. The connecting device is connected downstream of the continuously variable transmission section.

DE 10 2014 205 039 A1 discloses a drivetrain of the type mentioned above having a continuously variable transmission with synchronous clutch actuation. The continuously variable transmission has two summation planetary gears, a variator and several clutches. The drivetrain has a purely hydrostatic drive section and two power-split sections. The clutches are located on the input side of the summation planetary gears, i.e. in a range of the power branch where the torque to be transmitted from the engine is exceeded by the reactive power from the hydrostatic power branch. A return operation is limited to the hydrostatic range, since there is no reversal of the direction of rotation of the mechanical branch and thus no equality of speed and direction of rotation arises at the clutch. At least three clutches are required to realize two power-split ranges. The power-split ranges are basically achieved by increasing the speed in the summation planetary gears, since the output shafts from the summation planetary gears are coupled directly to the gear output and increase steadily in speed. Due to this direct coupling of these two output shafts and the achieved equal directions of rotation of the output shafts of the variator, two different summation planetary gears are necessary to increase the output speed. The number of possible further stages is limited by the speeds within the summation planetary gears. Similar drivetrain arrangements are known from RU 2 191 303 C2 or DE 199 54 894 A1.

SUMMARY OF THE INVENTION

It is the object of the invention is to achieve a high speed and torque spread, as well as a flexible gear structure, with the least possible effort and small size.

Based on a drivetrain of the type mentioned at the beginning, this object is solved according to the invention in that the first transmission output element can be connected to the transmission output shaft via at least one first clutch and the second transmission output element can be connected to the transmission output shaft via at least one second clutch.

The at least one first and/or second clutch can prevent mechanical distortion of the drivetrain.

In terms of drive, the two clutches are arranged after the summation planetary gear, i.e. in each case between the summation planetary gear and the transmission output shaft, there are no more torque surges in this area during operation in the reactive power range.

By engaging the first clutch, a first power-split range can be realized, and by engaging the second clutch, a second power-split range can be realized.

Advantageously, the first transmission output element and/or the second transmission output element can be connected to the transmission output shaft via at least one further reverse drive clutch. This enables easy switching between forward and reverse travel. The reverse drive clutch can be used to implement a third power-split range.

The number of components and the required installation space can be kept small if the first transmission output element and/or the second transmission output element can be connected to the transmission output shaft via at least one clutch unit designed as a double clutch. In particular, at least a first or second clutch for forward travel can be combined with a first or second reverse travel clutch to form a clutch unit.

In one embodiment variant of the invention, it is provided that the primary transmission input shaft is connected or connectable to a driven machine, wherein preferably the driven machine and the secondary engine are preferably designed as a modular unit. Alternatively, it is also possible to arrange the secondary engine and the driven machine at a spatial distance from one another and to drive the driven machine via a gear stage or via a traction means through the primary transmission input shaft. The driven machine and the secondary drive machine can be arranged parallel to each other or on the same axis.

The driven machine and the secondary engine form a variator for changing the speeds at the transmission output shafts of the summation planetary gears. A variator is a continuously variable transmission in which the transmission ratio is infinitely variable. The variator can be hydraulic, electric or mechanical.

Preferably, the transmission unit has a hydrostatic transmission having a first hydraulic machine and a second hydraulic machine.

One embodiment variant of the invention provides that the transmission unit comprises a hydrostatic transmission having a first hydraulic machine and a second hydraulic machine, wherein the driven machine is a first hydraulic machine—for example a pump—and the secondary engine is a second hydraulic machine—for example a hydraulic motor—of the hydrostatic transmission. The hydrostatic transmission can be used to precisely control the speed at the transmission output shaft of the transmission arrangement. Alternatively to the first hydraulic machine and the second hydraulic machine, the driven machine and the secondary engine can also be formed by electric machines.

One embodiment variant of the invention provides that the driven machine is designed on the same axis with the transmission input shaft. This makes it possible to save installation space and components.

It is particularly advantageous if the first drive shaft and the second drive shaft are drive-connected to each other, preferably mechanically. This means that the first and second drive shafts can be driven via the control shaft of a single secondary engine. The connection between the two drive shafts can be made, for example, via gearwheels or via a traction means. Alternatively, it is also possible to drive the first drive shaft through a secondary first engine and the second drive shaft through a secondary second engine. In this case, a mechanical connection between the drive shafts can be dispensed with.

A summation planetary gear unit is a planetary gear unit in which two powers—in particular of a primary and a secondary engine—are combined into one. The summation planetary gear has a primary transmission input element for the primary engine and a secondary transmission input element for the secondary engine on the input side and a transmission output element on the output side. The summation planetary gear may be formed by a simple triple-shaft planetary gear having a sun gear, a planet carrier with a planetary gear set and a ring gear. The sun gear, planet carrier and ring gear form transmission input elements and the transmission output element.

If the sun gears rotate in different directions, two identical summation planetary gears can be used.

The two summation planetary gears, which are arranged in parallel, for example, allow the power to be routed either via one of the two power branches or via both power branches. A particularly smooth and jerk-free transition is possible when switching between the power branches, with switching preferably taking place during synchronous operation.

Advantageously, the first summation planetary gear has a first sun gear, a first planet carrier and a first ring gear, and the second summation planetary gear has a second sun gear, a second planet carrier and a second ring gear, wherein preferably the secondary first transmission input element is formed by the first sun gear and/or the secondary second transmission input element is formed by the second sun gear. The first and/or second sun gear thus forms the input of the power branch of the secondary engine.

Alternatively, it is also possible that the secondary first transmission input element is formed by the first ring gear or the first planet carrier and that the secondary second transmission input element is formed by the second ring gear or the second planet carrier.

In one embodiment variant of the invention, it is provided that the primary first transmission input element is formed by the first planet carrier and the first transmission output element is formed by the first ring gear. As an alternative thereto, the primary first transmission input element may be formed by the first ring gear and the first transmission output element may be formed by the first planet carrier.

In one embodiment variant according to the invention, it is provided that the primary second transmission input element is formed by the second planet carrier and the second transmission output element is formed by the second ring gear. Alternatively, it can also be provided that the primary second transmission input element is formed by the second ring gear and the second transmission output element is formed by the second planet carrier.

In this way, power summation of the two engines in the two summation planetary gears is made possible in a structurally simple manner.

Furthermore, the shifting functionality can be increased if at least one shiftable output transmission stage and/or at least one shiftable range stage is arranged between at least one transmission output element and the transmission output shaft.

A short and compact design is obtained when the primary transmission input shaft and the secondary transmission input shaft are parallel to each other and spaced apart.

In one embodiment variant of the invention, it is provided that the axis of rotation of the secondary first transmission input element and the axis of rotation of the secondary second transmission input element are arranged parallel to and spaced apart from each other. In particular, advantageously, the first summation planetary gear and the second summation planetary gear can be arranged parallel to each other so that the power can be selectively routed via one of two power branches or via both power branches.

According to one embodiment variant of the invention, it is provided that a drive gear arranged on the transmission input shaft is in mesh with both the primary first transmission input element of the first summation planetary gear and the primary second transmission input element of the second summation planetary gear, wherein preferably the drive gear forms a primary first drive transmission stage with the primary first transmission input element and the drive gear forms a primary second drive transmission stage with the primary second transmission input element.

An alternative embodiment provides that the secondary first transmission input element and the secondary second transmission input element are arranged on the same axis, wherein preferably the first sun gear and the second sun gear are formed on the same shaft.

With the two summation planetary gears arranged in parallel, the transmission arrangement can be used to realize two or more gear ranges with continuously variable speeds for an output.

By arranging the clutches and shifting elements on the output side of the gear arrangement, it is in principle possible to arrange any number of stages with, for example, preselection shifting, without any limitation occurring in the range or within the summation planetary gear due to ever increasing speeds.

BRIEF DESCRIPTION OF THE DRAWINGS

The invention is explained in more detail below with reference to the non-limiting embodiments shown in the figures, which schematically show as follows:

FIG. 11 shows a transmission arrangement according to the invention in an eleventh embodiment variant;

FIG. 12 shows a transmission arrangement according to the invention in a twelfth embodiment variant;

FIG. 13 shows a transmission arrangement according to the invention in a thirteenth embodiment, as a detailed variation of the transmission arrangement shown in FIG. 12.

DETAILED DESCRIPTION

Figure 1:
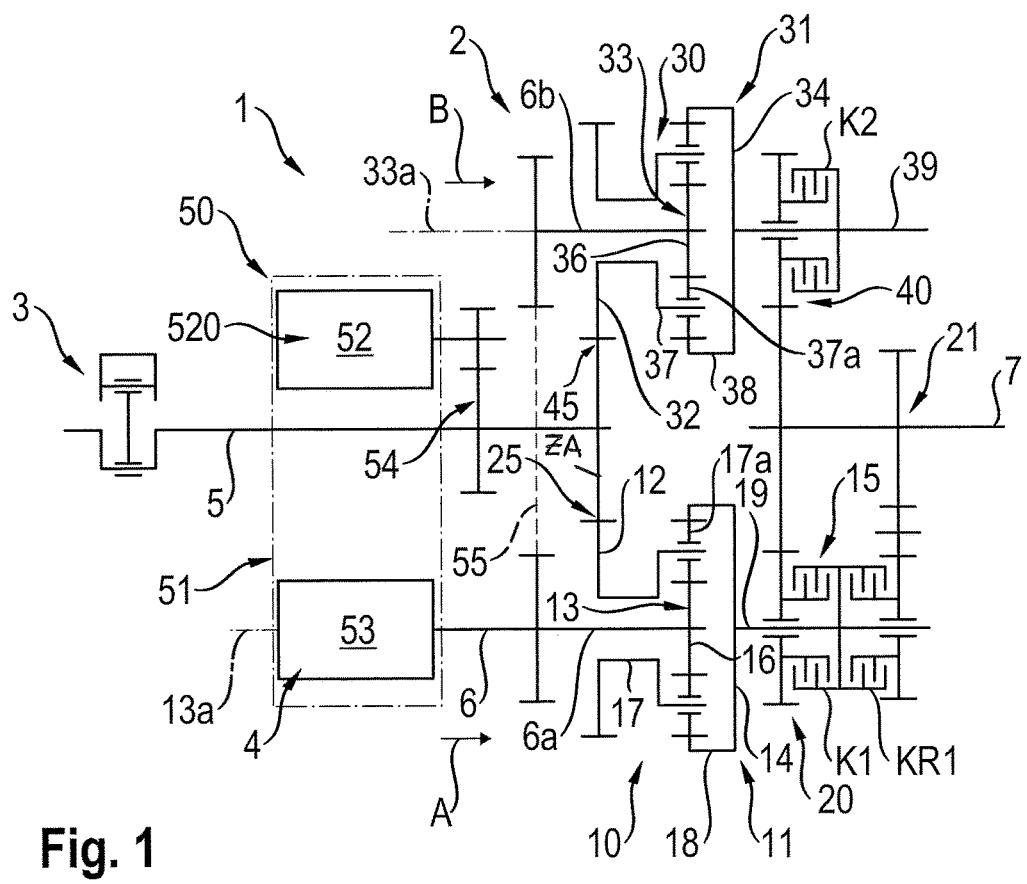
FIG. 1 shows a transmission arrangement according to the invention in a first embodiment variant.

Parts with identical functions are given the same reference numerals in the figures.

FIGS. 1 to 14 each show a drivetrain 1 for a motor vehicle having a transmission arrangement 2 with two power branches A, B. The drivetrain 1 has a primary engine 3 formed, for example, by an internal combustion engine, and a secondary engine 4.

Figure 5:
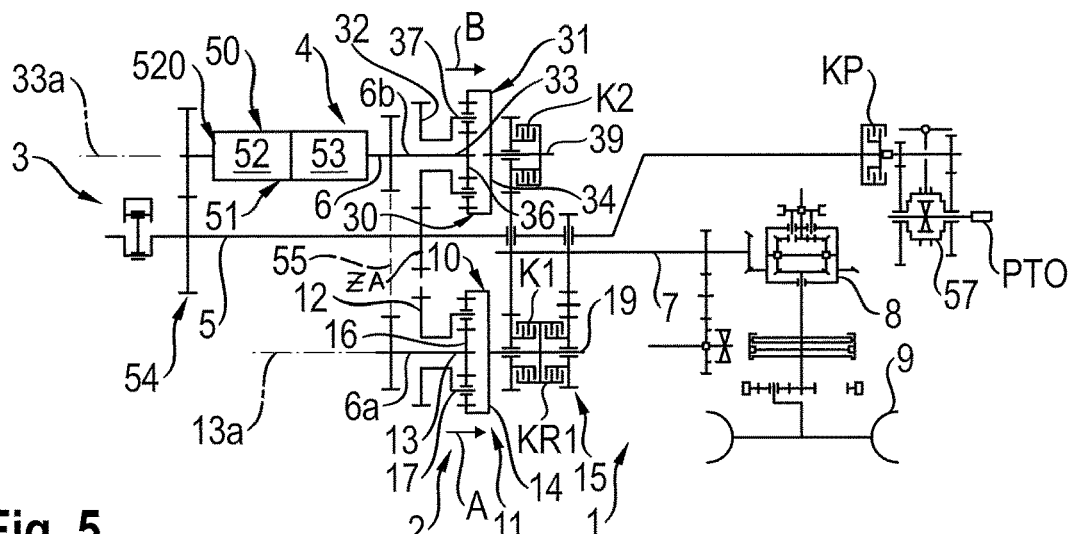
FIG. 5 shows a transmission arrangement according to the invention in a fifth embodiment variant.

The transmission arrangement 2 comprises a transmission input shaft 5 drive-connected to the primary engine 3, first 6a and second drive shafts 6b drive-connected to the secondary engine 4, and a transmission output shaft 7 which is connected—for example via a differential 8 shown in FIG. 5—to drive wheels 9 of the motor vehicle.

The transmission arrangement 2 has a first continuously variable transmission section 10—forming a first power branch A—having a triple-shaft first summation planetary gear 11 with two first transmission input elements 12, 13 and a first transmission output element 14. Furthermore, the transmission arrangement 2 has a second continuously variable transmission section 30—forming a second power branch B—having a triple-shaft second summation planetary gear 31 with two transmission input elements 32, 33 and a second transmission output element 34. Reference numeral 13a designates the axis of rotation of the secondary first transmission input element 13 and reference numeral 33a designates the axis of rotation of the secondary second transmission input element 33.

The primary first transmission input element 12 of the first summation planetary gear 11 is mechanically connected to the transmission input shaft 5. The first drive shaft 6a connected to the secondary first transmission input element 13 of the first summation planetary gear 11 is mechanically connected to the secondary control shaft 6.

Also, the primary second transmission input element 32 of the second summation planetary gear 31 is mechanically connected to the primary transmission input shaft 5. A secondary drive shaft 6b connected to the secondary second transmission input element 33 of the second summation planetary gear 31 is mechanically connected to the control shaft 6. The control shaft 6 is formed by the output shaft of the secondary engine 4.

The first transmission output element 14 of the first summation planetary gear 11 is drive-connectable to the transmission output shaft 7 via at least one first clutch unit 15, and the second transmission output element 34 of the second summation planetary gear 31 is drive-connectable to the transmission output shaft 7 via at least one second clutch unit 35.

The primary transmission input shaft 5 is drive-connected to a driven machine 520. The driven machine 520 and the secondary engine 4 form a variator 50 and can be designed as a modular unit and/or on the same axis or in parallel. As an alternative to a modular unit, a separate design of driven machine 520 and secondary engine 4 is also possible.

In the exemplary embodiments, the variator 50 is formed by a hydrostatic transmission 51. The driven machine 520 is formed by a first hydraulic machine 52—for example a hydraulic pump—and the secondary engine 4 is formed by a second hydraulic machine 53—for example a hydraulic motor. The first hydraulic machine 52 and—possibly also the second hydraulic machine 53—of the hydrostatic transmission 51 has a device for adjusting the delivery volume in a known manner. The two hydraulic machines 52, 53 are preferably designed to be reversible. In addition to the design of the variator 50 as a hydrostatic transmission 51, it is also possible to design the variator 50 electrically, wherein the driven machine 520 and the secondary drive machine 4 are formed by electric machines.

The first hydraulic machine 52 is drive-connected to the primary transmission input shaft 5, and the second hydraulic machine 53 is mechanically coupled to the control shaft 6 of the transmission arrangement 2. The first drive shaft 6a is mechanically connected to the second drive shaft 6b, whereby the second hydraulic machine 53 simultaneously acts on the secondary first transmission input element 13 and the secondary second transmission input element 33 via the control shaft 6.

The first summation planetary gear 11 has a first sun gear 16, a first planet carrier 17 with a set of first planet gears 17a, and a first ring gear 18. The second summation planetary gear 31 has a second sun gear 36, a second planet carrier 37 with a set of second planet gears 37a, and a second ring gear 38.

In all exemplary embodiments, the secondary first transmission input element 13 is formed by the first sun gear 16 and the secondary second transmission input element 33 is formed by the second sun gear 36. However, it is also possible that the secondary first 13 or second transmission input element 33 is formed by the first 18 or second ring gear 38.

The primary first transmission input element 12 can be formed either by the first planet carrier 17 or by the first ring gear 18. Similarly, the primary second transmission input element 32 can be formed either by the second planet carrier 37 or by the second ring gear 38. However, it is also possible that the primary first transmission input element 12 or the primary second transmission element 32 is formed by the first 16 or second sun gear 36.

In each of the embodiment variants of the invention shown in FIGS. 1 to 5, FIG. 11, FIG. 13 and FIG. 14, a drive gear ZA arranged on the transmission input shaft 5 is in mesh with both the primary first transmission input element 12 of the first summation planetary gear 11 and the primary second transmission input element 32 of the second summation planetary gear 31. The drive gear ZA forms a primary first drive gear stage 25 with the primary first transmission input element 12, and the drive gear ZA forms a primary second drive gear stage 45 with the primary second transmission input element 32.

FIG. 1 shows a first embodiment variant having first 11 and second summation planetary gears 31 arranged parallel to each other. The primary first 12 and second transmission input elements 32 are formed by first 17 and second planet carriers 37. The first ring gear 18 forms the first transmission output element 14 and the second ring gear 38 forms the second transmission output element 34.

The primary transmission input shaft 5 drives the first hydraulic machine 52 of the hydrostatic transmission 51 via a first spur gear stage 54, the first planet carrier 17 via the primary first drive gear stage 25, and the second planet carrier 37 via the primary second drive gear stage 45. The second hydraulic machine 52 drives the first drive shaft 6a via the control shaft 6 and the second drive shaft 6b via the coupling gear 55, wherein the control shaft 6 is designed to be on the same axis as the first drive shaft 6a.

The first transmission output element 14 is connected to a first transmission output shaft 19 and the second transmission output element 34 is connected to a second transmission output shaft 39. The first transmission output shaft 19 can be drive-connected to the first clutch K1 for forward travel or the first reverse travel clutch KR1 via the first clutch unit 15, and the second transmission output shaft 39 can be drive-connected to the transmission output shaft 7 via the second clutch K2.

A first forward transmission stage 20 for forward travel and a first reverse transmission stage 21 for reverse travel are arranged between the first transmission output shaft 19 and the transmission output shaft 7, wherein the first forward transmission stage 20 is activated via the first clutch K1, assigned to forward travel, of the first clutch unit 15 designed as a double clutch, and the first reverse transmission stage 21 is activated via the first reverse travel clutch KR1, assigned to reverse travel, of the first clutch unit 15.

Furthermore, between the second transmission output shaft 39 and the transmission output shaft 7, a second forward transmission stage 40 is arranged for forward travel, which is activated by the second clutch K2.

The second hydraulic machine 53, which is hydraulically connected to the first hydraulic machine 52, drives the first sun gear 16 of the first summation planetary gear 11 via the control shaft 6 and the first drive shaft 6a. The first drive shaft 6a is mechanically connected to the second drive shaft 6b via a coupling gear 55 designed, for example, as a traction gear or spur gear, so that the second hydraulic machine 53 also drives the second transmission drive shaft 6b synchronously via the coupling gear 55, for example at the same speed—or via a selected transmission ratio with a different speed and/or direction of rotation—, to the first sun gear 16 of the first summation planetary gear 11, to the second sun gear 36 of the second summation planetary gear 31. The two summation planetary gear units 11, 31 can be of identical design.

The mechanical drive of the two summation planetary gears 11, 31 is provided by the planet carriers 17, 37 through gear stages with different ratios, the output is provided by the ring gears 18, 38 of the summation planetary gears 11, 31, again with different ratios to the transmission output shaft 7.

The second hydraulic machine 53 is connected to the summation planetary gears 11, 31 via 2 different gear ratios and the same or different directions of rotation in such a way that the changeover between the two summation planetary gears 11, 31 can take place when the clutch K1 and K2 run synchronously.

A zero driving speed is achieved in a power-split manner; at zero driving speed, the return range can be engaged by switching the clutches from K1 to KR1, i.e. opening the first clutch K1 assigned to forward driving and closing the first reverse driving clutch KR1 assigned to reverse driving (at zero output speed). The ratios for forward travel and reverse travel can be selected as desired.

Thus, the full speed range can be covered with two CVT ranges in one direction of travel.

Figure 2:
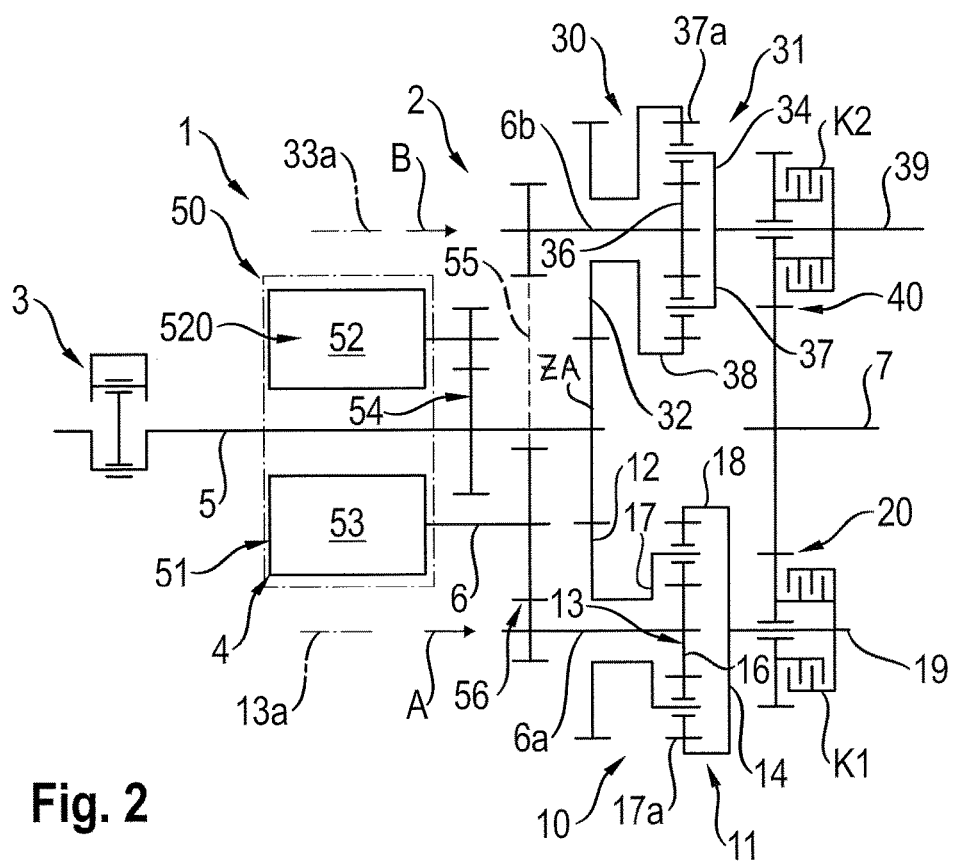
FIG. 2 shows a transmission arrangement according to the invention in a second embodiment variant.

The second embodiment variant shown in FIG. 2 differs from the first embodiment variant in that a second spur gear stage 56 is arranged between the control shaft 6 and the first drive shaft 6a. As a result, the first drive shaft 6a and the second drive shaft 6b can be driven by the second hydraulic machine 53 with the same direction of rotation, possibly also with different rotational speeds. If the sun gears 13, 33 are driven with the same direction of rotation, the primary first 12 and second transmission input elements 32 driven by the primary transmission input shaft 5 must be different. In the exemplary embodiment shown in FIG. 2, the primary first transmission input element 12 is the first planet carrier 17 and the primary second transmission input element 32 is the second ring gear 38.

Figure 3:
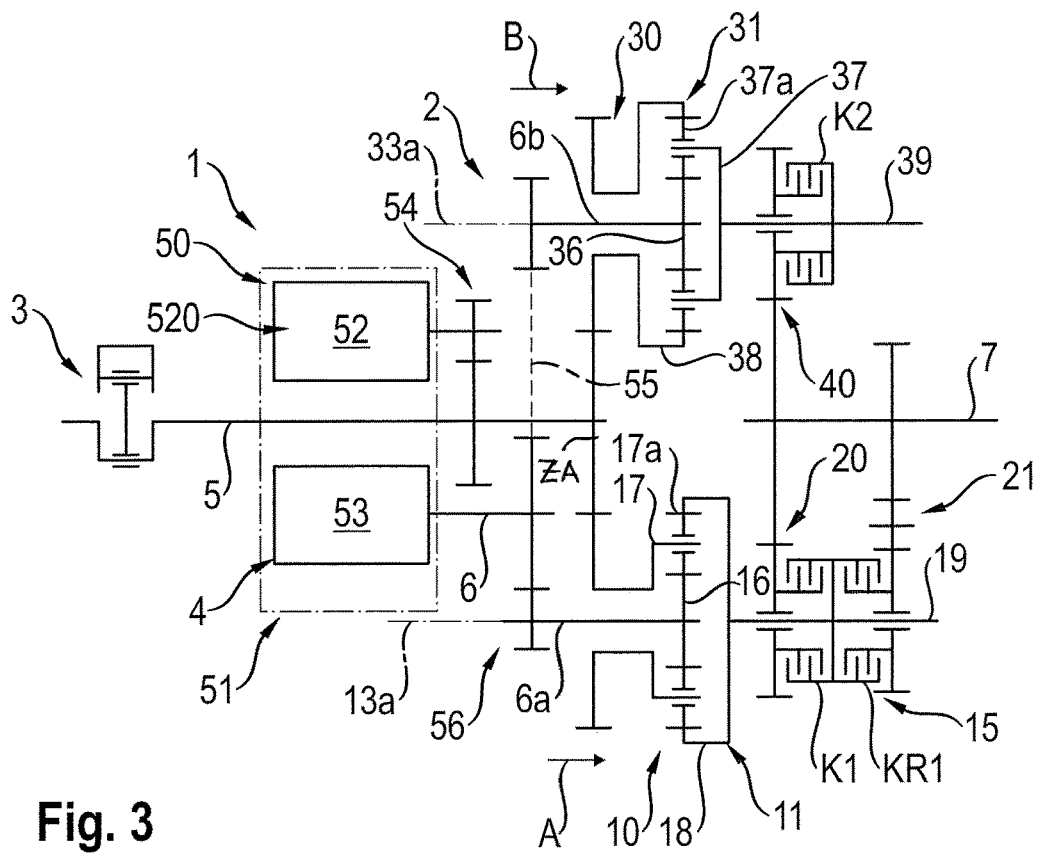
FIG. 3 shows a transmission arrangement according to the invention in a third embodiment variant.

The second embodiment variant shown in FIG. 3 differs from the first embodiment variant primarily in that the two summation planetary gear units 11, 31 are designed differently.

As in FIG. 1 and FIG. 2, the primary first transmission input element 12 is formed by the first planet carrier 17, wherein the first ring gear 18 of the first summation planetary gear 11 forms the first transmission output element 14. However, in contrast to FIG. 1, and analogously to FIG. 2, the primary second transmission input element 32 is formed by the second ring gear 38 and the second transmission output element 34 is formed by the second planet carrier 37, which is firmly connected to the second transmission output shaft 39. In contrast to FIG. 2, and analogously to FIG. 1, the transmission arrangement 2 has an additional first reverse drive clutch KR1 for reverse drive on the output side of the first summation planetary gear 11.

Figure 4:
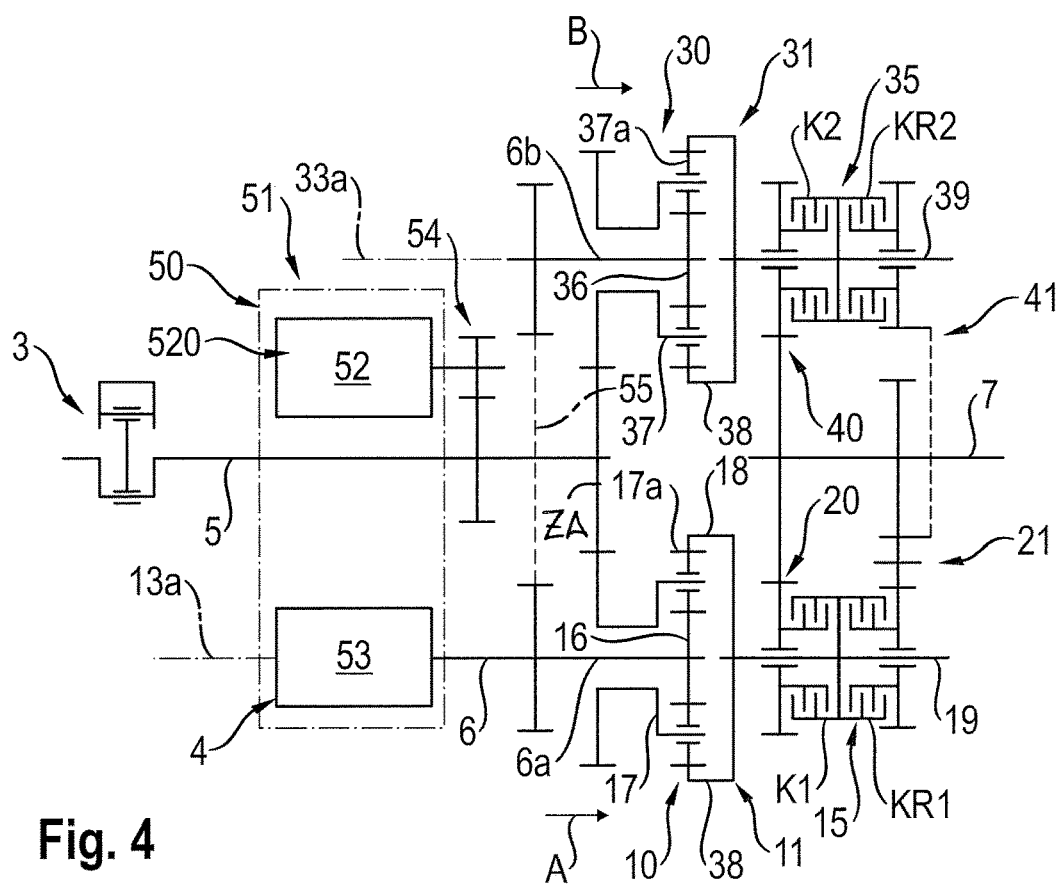
FIG. 4 shows a transmission arrangement according to the invention in a fourth embodiment variant.

FIG. 4 shows a fourth embodiment variant similar to FIG. 1, wherein a second reverse transmission stage 41 for reverse travel is additionally arranged between the second transmission output shaft 39 and the transmission output shaft 7, wherein the first reverse transmission stage 21 for reverse travel can be drive-connected to the first transmission output shaft 19 via the first clutch KR1 and the second reverse transmission stage 41 for reverse travel can be drive-connected to the second transmission output shaft 39 via the second clutch KR2.

In the fifth embodiment variant shown in FIG. 5, the primary transmission input shaft 5 is connected to a secondary transmission output shaft PTO (power take-off shaft) via a clutch KP and a range change device 57. The control shaft 6, on which the second hydraulic machine 53 acts, is arranged on the same axis as the second transmission input shaft 6b and thus acts directly on the secondary second transmission input element 33. The first hydraulic machine 52 is also arranged here with the same axis as the second hydraulic machine 53.

FIG. 6 to FIG. 10 show embodiment variants of the invention in which the two summation planetary gear units 11, 31 are arranged on the same axis. In this case, the primary transmission input shaft 5 drives the primary first transmission input element 12 formed by the first planet carrier 17 of the first summation planetary gear 11 via a primary first spur gear stage 58 and the primary second transmission input element 32 formed by the second planet carrier 37 of the second summation planetary gear 31 via a primary second spur gear stage 59. The first transmission output element 14 is formed by the first ring gear of the first summation planetary gear 11 and the second transmission output element 34 is formed by the second planet carrier 37 of the second summation planetary gear 31.

Between the first transmission output shaft 19 and the transmission output shaft 7, a first forward transmission stage 20 for forward travel is arranged, which is activated by the first clutch K1. Furthermore, between the second transmission output shaft 39 and the transmission output shaft 7, a second forward transmission stage 40 for forward travel is arranged, which is activated by the second clutch K2.

The idler gears 20a, 40a of the forward transmission stages 20, 40 are arranged coaxially relative to the first and second transmission output shafts 19, 39. The fixed gears 20b, 40b of the transmission stages 20, 40 are located on the transmission output shaft 7.

The first hydraulic machine 52 is driven directly by the primary transmission input shaft 5 in FIGS. 6 to 10. The first hydraulic machine 52 and the second hydraulic machine 53 are designed as a modular unit.

The embodiment variants differ in the number and arrangement of clutches and transmission stages.

Figure 6:
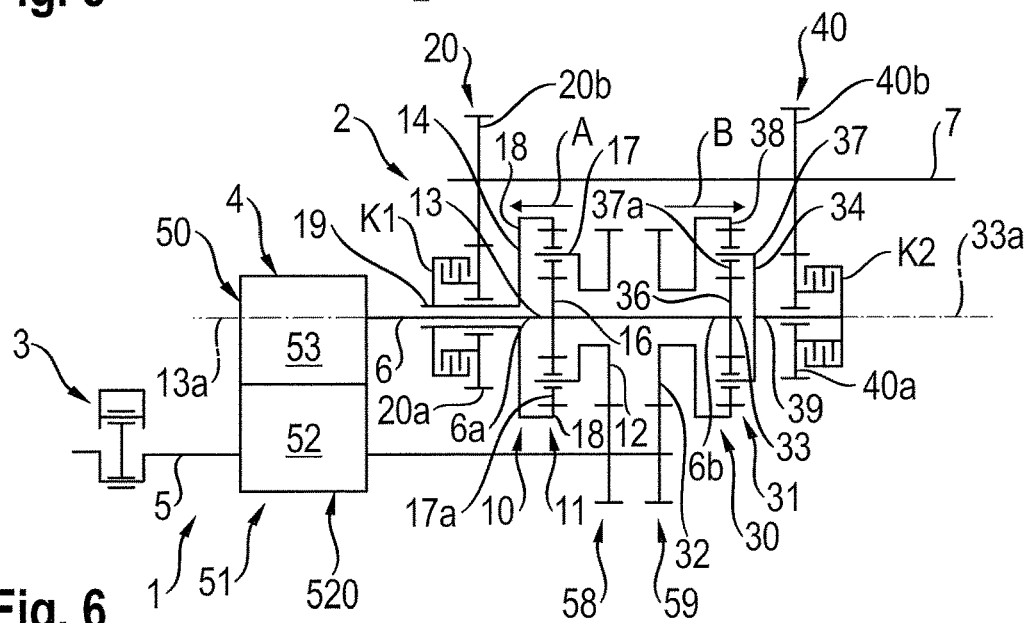
FIG. 6 shows a transmission arrangement according to the invention in a sixth embodiment variant.

In the sixth embodiment shown in FIG. 6, only first and second forward transmission stages 20, 40 are provided for forward travel.

Figure 7:
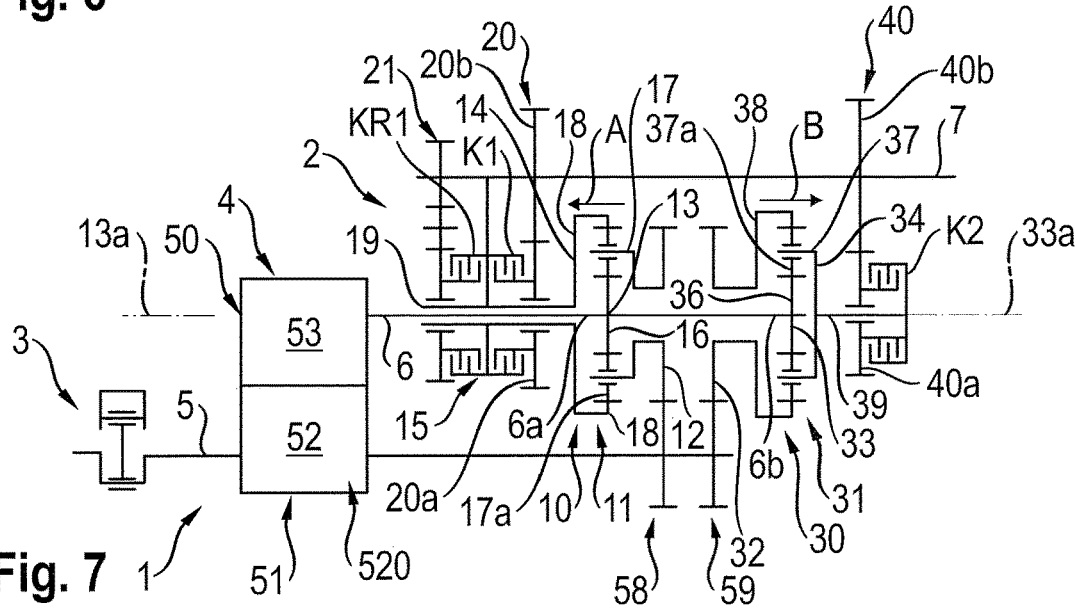
FIG. 7 shows a transmission arrangement according to the invention in a seventh embodiment variant.

FIG. 7 shows an embodiment in which a first reverse transmission stage 21 for reverse travel is additionally arranged between the first transmission output shaft 19 and the transmission output shaft 7, which is activated via a first reverse travel clutch KR1 assigned to reverse travel. The first clutches K1 and the first reverse drive clutch KR1 are integrated in a clutch unit 15, which is formed by a double clutch, for example.

Figure 8:
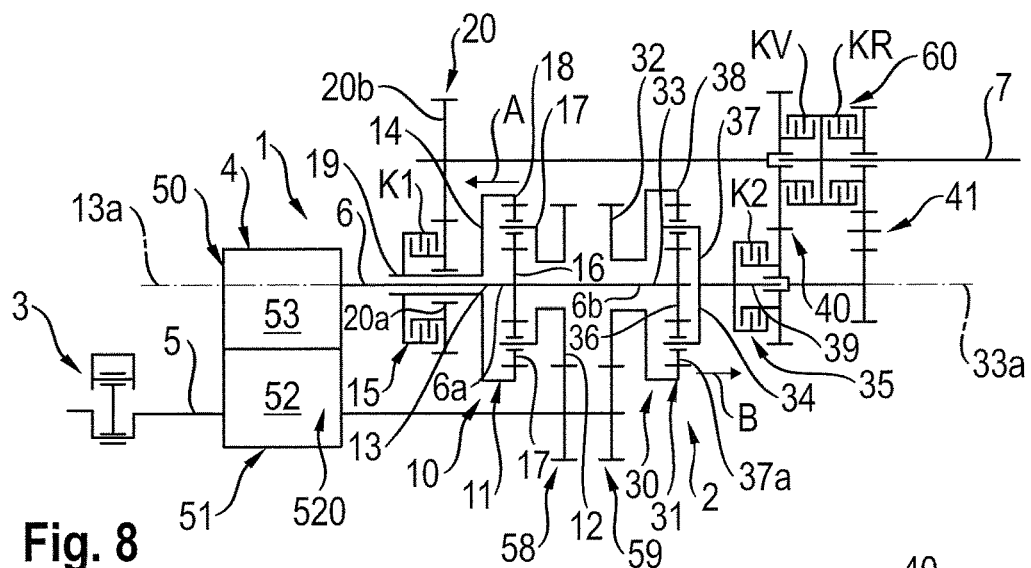
FIG. 8 shows a transmission arrangement according to the invention in an eighth embodiment variant.

FIG. 8 shows another embodiment variant with a second reverse transmission stage 41 originating from the second transmission output shaft 39, wherein it is possible to switch between forward travel and reverse travel by means of a reversing group 60 comprising the clutches KV and KR.

Figure 9:
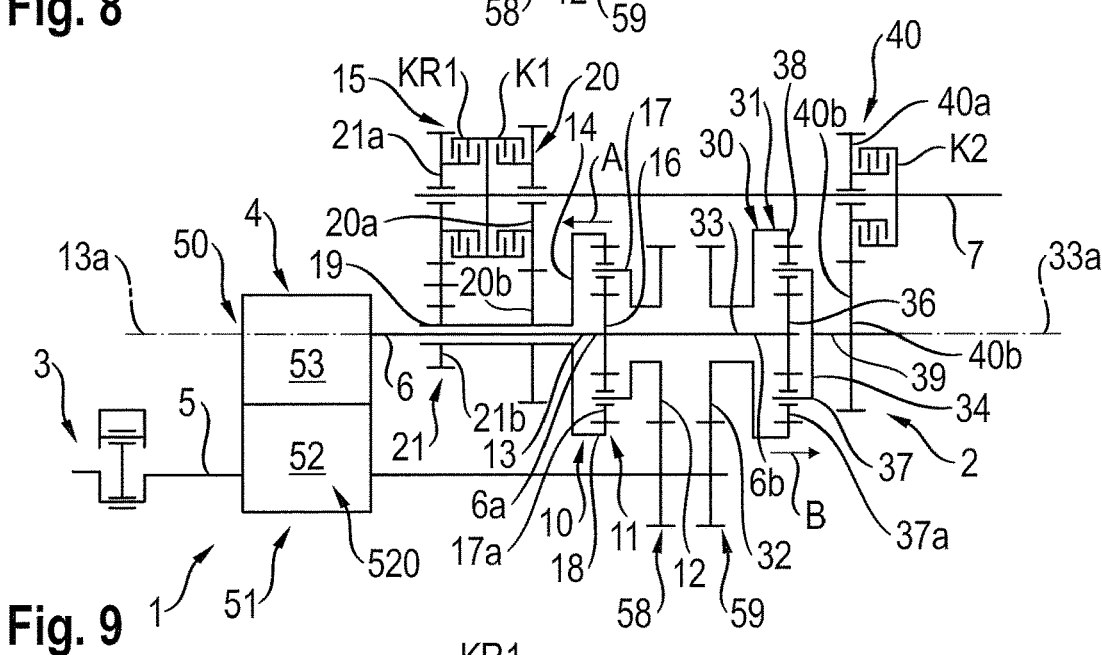
FIG. 9 shows a transmission arrangement according to the invention in a ninth embodiment variant.

The ninth embodiment variant shown in FIG. 9 differs from FIG. 7 in that the idler gears 20a, 40a; 21a of the forward transmission stages 20, 40 and the first reverse transmission stage 21 are arranged on the transmission output shaft 7. In contrast, the fixed gears 20b, 21b of the first forward transmission stage 20 and the reverse transmission stage 21 are rotationally connected to the first transmission input shaft 19, and the fixed gear 40b of the second forward transmission stage 40 is rotationally connected to the second transmission input shaft 39.

Figure 10:
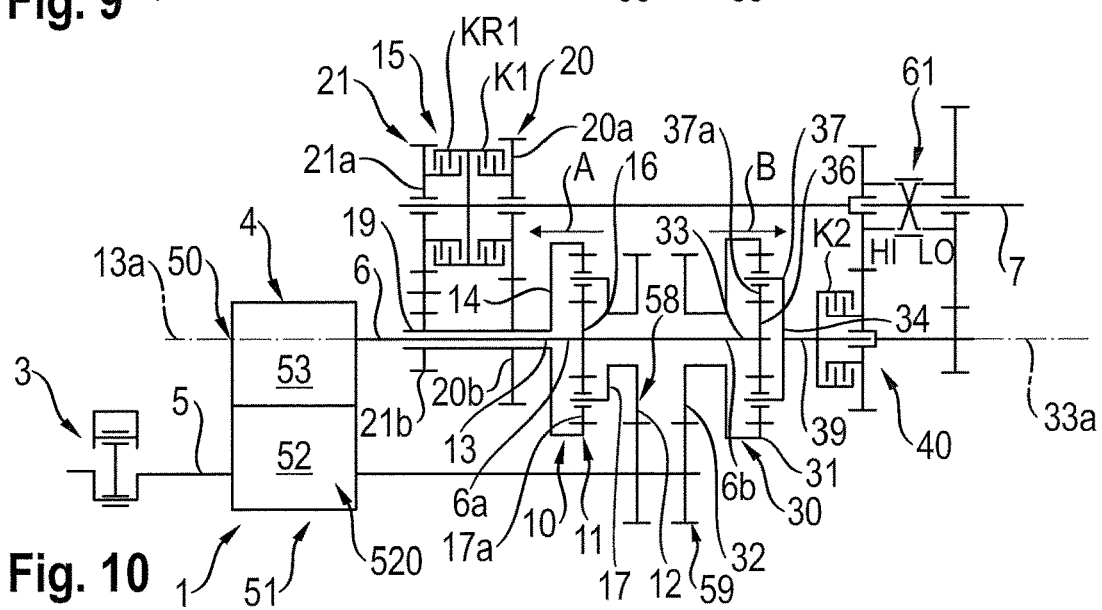
FIG. 10 shows a transmission arrangement according to the invention in a tenth embodiment variant.

Based on the ninth embodiment variant, in the tenth embodiment shown in FIG. 10, a range stage 61 is additionally provided between the second transmission output shaft 39 and the transmission output shaft 7, which can be used to switch between a high-speed range HI and a creep range LO.

FIG. 11 shows an eleventh embodiment variant of the invention with summation planetary gear units 11, 31 arranged parallel to each other and parallel to the primary transmission input shaft 5. The first hydraulic machine 52, connected to the primary transmission input shaft 5 via a first spur gear stage 54, forms a modular unit with the second hydraulic machine 53. As an alternative to the common modular unit, however, the two hydraulic machines 52, 53 can also be arranged separately and/or spatially separated from one another and connected to one another by hydraulic lines.

As in FIG. 1, the primary first 12 and second transmission input elements 32 are formed by first 17 and second planet carriers 37. Again, the first ring gear 18 forms the first transmission output element 14 and the second ring gear 38 forms the second transmission output element 34.

The primary transmission input shaft 5 drives the first hydraulic machine 52 of the hydrostatic transmission 51 via the first spur gear stage 54, the first planet carrier 17 via a primary first drive gear stage 25, and the second planet carrier 37 via a primary second drive gear stage 45, which generates a different transmission ratio and/or direction of rotation to the primary first drive gear stage 25.

The first transmission output element 14 is connected to a first transmission output shaft 19 and the second transmission output element 34 is connected to a second transmission output shaft 39. The first transmission output shaft 19 can be drive-connected to the transmission output shaft 7 via the first clutch K1, and the second transmission output shaft 39 can be drive-connected to the transmission output shaft 7 via the second clutch K2, with a reversing group 60 additionally being arranged between the transmission output shafts 19, 39 and the transmission output shaft 7.

FIG. 12 and FIG. 13 show embodiment variants with modified arrangements of the hydraulic machines 52 and 53, which are designed as a common assembly. In FIG. 12, the first hydraulic machine 52 is driven directly and in FIG. 13 indirectly via a first spur gear stage 54 by the primary transmission input shaft 5.

Figure 14:
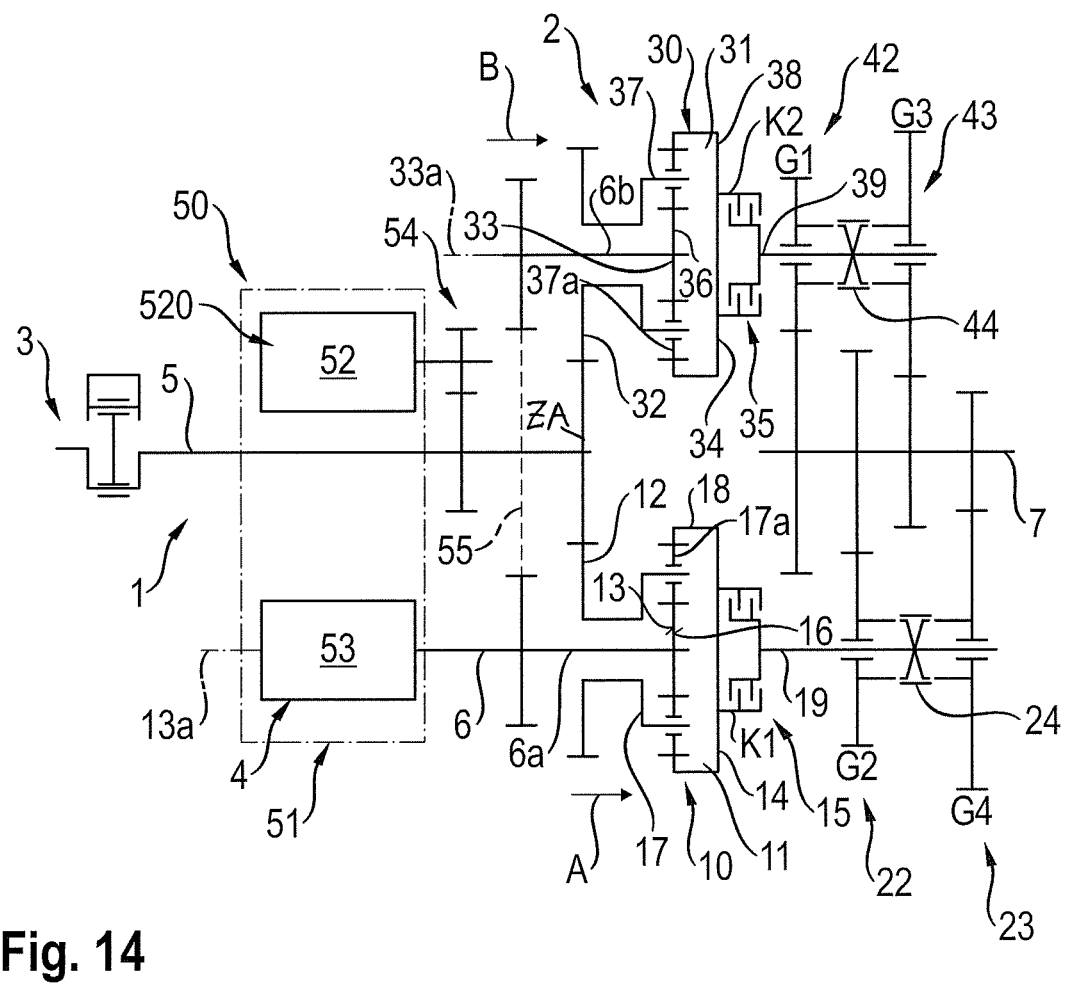
FIG. 14 shows a transmission arrangement according to the invention in a fourteenth embodiment.

FIG. 14 shows a further embodiment of a transmission arrangement 2 similar to FIG. 1, wherein first output transmission stages 22, 23, and second output transmission stages 42, 43 for gears G1, G2, G3, G4 are arranged between the transmission output shafts 19, 39 and the transmission output shaft 7, which can be shifted via first 24 and second gear shift elements 44.

The first clutch unit 15 is arranged between the first transmission output element 14 formed by the first ring gear 18 of the first summation planetary gear 11 and the first transmission output shaft 19. The second clutch unit 35 is arranged between the second transmission output element 34 formed by the second ring gear 38 of the second summation planetary gear 31 and the second transmission output shaft 39.

Through the two summation planetary gears 11, 31 arranged in parallel, the power is selectively routed through the two power branches A, B.

The mechanical drive of the two summation planetary gear units 11, 31 is provided by the planet carriers 17, 37 via gear stages with different or the same gear ratios, the output is provided by the ring gears 18, 38 of the summation planetary gear units 11, 31, again with different gear ratios to the transmission output shaft 7. The input and output of the planet carriers 17, 37 and the ring gear 18, 38 of each summation planetary gear unit 11, 31 can also be interchanged.

Via different directions of rotation of the sun gears 16, 36, in each case the transmission output shaft 19, 39 of one summation planetary gear 11, 31 is accelerated while the transmission output shaft 39, 19 of the other summation planetary gear 31, 11 slows down.

One or more shiftable output transmission stages 22, 23; 42, 43 are connected to both transmission output shafts 19, 39, which can be preselected by the gear shift elements 24, 44 in a manner comparable to dual-clutch transmissions without frictional engagement.

With the output transmission stage 22, 23; 42, 43 switched, synchronous operation then results at the end point of the spreading range of a power branch A at the second clutch K2 of the other power branch B, and the power flow can be switched over from one power branch A to the other power branch B. Afterwards, the first power branch A can be preselected again and switched over again during synchronous operation.

In contrast to other systems, the first power branch A is accelerated and the second power branch B is simultaneously reduced in speed. Then the changeover takes place and the second power branch B is accelerated while the speed of the first power branch A is reduced again. At the respective point with the lowest speed, the new power branch is coupled and then accelerated again.

The number of output transmission stages 22, 23; 42, 43 can be selected as desired, depending on the speed requirements of the vehicle. The number of shift elements must be increased accordingly. Furthermore, individual stages with reversal of the direction of rotation can also be designed as return ranges—for example, four forward and two reverse ranges. Alternatively, a downstream reversing group 60 can advantageously be designed for reversing the direction of rotation.

The hydraulic transmission 51 can be integrated into a common housing of the transmission arrangement 2—not shown in further detail—or attached externally to the housing, i.e. the two hydraulic machines 52, 53 can be arranged outside the housing.

The hydraulic machines 52 and 53 can be arranged axially one behind the other on the same axis, or they can be arranged parallel side by side.

The invention claimed is:

1. Drivetrain for a motor vehicle comprising:
   a transmission arrangement for a motor vehicle with a primary engine, the transmission arrangement including
   a transmission input shaft which can be connected or is connected to the primary engine,
   a transmission output shaft;
   a first summation planetary gear unit having primary and secondary first transmission input elements, and a first transmission output element; and
   a second summation planetary gear unit having primary and secondary second transmission input elements and a second transmission output element;
   wherein the first transmission output element is connectable to the transmission output shaft via a first clutch and the second transmission output element is configured and arranged to be connected to the transmission output shaft via a second clutch,
   wherein the primary first transmission input element of the first summation planetary gear is mechanically connected to the transmission input shaft via a primary first drive gear stage and the primary second transmission input element of the second summation planetary gear is mechanically connected to the transmission input shaft via a primary second drive gear stage, and
   wherein the secondary first transmission input element of the first summation planetary gear is configured and arranged to be connected to a secondary engine via a first drive shaft and a control shaft, and the secondary second transmission element of the second summation planetary gear are configured and arranged to be connected to the secondary engine via a second drive shaft, a coupling gear and the control shaft, wherein the secondary engine is configured to drive the second drive shaft and the secondary second transmission input elements of the second summation planetary gear via the coupling gear synchronously to the secondary first transmission input element of the first summation planetary gear at the same or different speed and with the same or different direction of rotation.

2. The drivetrain according to claim 1, characterized in that the first transmission output element or the second transmission output element are configured and arranged to be connected to the transmission output shaft via at least one reverse drive clutch.

3. The drivetrain according to claim 1, characterized in that the first transmission output element or the second transmission output element are configured and arranged to be connected to the transmission output shaft via at least one clutch unit.

4. The drivetrain according to claim 1, characterized in that the transmission input shaft is configured and arranged to be connected to a driven machine.

5. The drivetrain according to claim 1, characterized in that the first summation planetary gear includes a first sun gear, a first planet carrier and a first ring gear, and
   the second summation planetary gear includes a second sun gear, a second planet carrier and a second ring gear.

6. The drivetrain according to claim 5, characterized in that the primary first transmission input element includes the first planet carrier, and
   the first transmission output element includes the first ring gear.

7. The drivetrain according to claim 5, characterized in that the primary second transmission input element includes the second planet carrier, and
   the second transmission output element includes the second ring gear.

8. The drivetrain according to claim 1, further including at least one shiftable output transmission stage and a shiftable range stage is arranged between at least one transmission output element and the transmission output shaft.

9. The drivetrain according to claim 1, wherein at least one of the first drive shaft and the second drive shaft is arranged parallel to and spaced apart from the primary transmission input shaft.

10. The drivetrain according to claim 1, characterized in that a drive gear arranged on the transmission input shaft is configured and arranged to mesh with both the primary first transmission input element and with the primary second transmission input element.

11. The drivetrain according to claim 1, characterized in that the secondary first transmission input element and the secondary second transmission input element are arranged on the same axis,
   wherein the first sun gear and the second sun gear are formed on the same shaft.

12. The drivetrain according to claim 1, wherein the first drive shaft connected to the secondary first transmission input element, and the second drive shaft connected to the secondary second transmission input element are drive-connected to one another.

13. The drivetrain according to claim 3, wherein the at least one clutch unit is a double clutch unit.

14. The drivetrain according to claim 4, wherein the transmission arrangement is a hydrostatic transmission having a first hydraulic machine and a second hydraulic machine, and
wherein the driven machine includes the first hydraulic machine and the secondary engine, the secondary engine is the second hydraulic machine of the hydrostatic transmission.

15. The drivetrain according to claim 5, wherein the secondary first transmission input element includes the first sun gear.

16. The drivetrain according to claim 5, wherein the primary second transmission input element includes the second ring gear, and
the second transmission output element includes the second planet carrier.

17. The drivetrain according to claim 10, wherein the drive gear forms both a primary first drive gear stage with the primary first transmission input element, and the primary second drive gear stage with the primary second transmission input element.

18. The drivetrain according to claim 1, wherein the primary engine is an internal combustion engine.

19. The drivetrain according to claim 1, wherein at least one of the first summation planetary gear unit and the second summation gear unit is formed as a triple-shaft planetary gear unit.

20. The drivetrain according to claim 4, wherein the driven machine and the secondary engine are a modular unit.

21. The drivetrain according to claim 5, wherein the secondary second transmission input element includes the second sun gear.

22. Drivetrain for a motor vehicle comprising:
a transmission arrangement for a motor vehicle with a primary engine, the transmission arrangement including
a transmission input shaft which can be connected or is connected to the primary engine, and
a transmission output shaft;
a first summation planetary gear unit having primary and secondary first transmission input elements, and a first transmission output element; and
a second summation planetary gear unit having primary and secondary second transmission input elements and a second transmission output element;
wherein the primary first transmission input element of the first summation planetary gear and the primary second transmission input element of the second summation planetary gear are mechanically connected to the transmission input shaft, and
wherein the secondary first transmission input element of the first summation planetary gear and the secondary second transmission element of the second summation planetary gear are configured and arranged to be connected to a secondary engine, characterized in that the first transmission output element is connectable to the transmission output shaft via a first clutch and the second transmission output element is configured and arranged to be connected to the transmission output shaft via a second clutch;
characterized in that a first axis of rotation of the secondary first transmission input element and a second axis of rotation of the secondary second transmission input element are arranged parallel to and spaced apart from each other.

23. Drivetrain for a motor vehicle comprising:
a transmission arrangement for a motor vehicle with a primary engine, the transmission arrangement including
a transmission input shaft which can be connected or is connected to the primary engine, and
a transmission output shaft;
a first summation planetary gear unit having primary and secondary first transmission input elements, and a first transmission output element; and
a second summation planetary gear unit having primary and secondary second transmission input elements and a second transmission output element;
wherein the primary first transmission input element of the first summation planetary gear and the primary second transmission input element of the second summation planetary gear are mechanically connected to the transmission input shaft, and
wherein the secondary first transmission input element of the first summation planetary gear and the secondary second transmission element of the second summation planetary gear are configured and arranged to be connected to a secondary engine, characterized in that the first transmission output element is connectable to the transmission output shaft via a first clutch and the second transmission output element is configured and arranged to be connected to the transmission output shaft via a second clutch;
characterized in that the first summation planetary gear unit and the second summation planetary gear unit are arranged parallel to one another, and configured and arranged so that power can selectively be routed via one of two power branches or via both power branches of the transmission arrangement.

24. The drivetrain according to claim 1, characterized in that the first transmission output element and the second transmission output element are configured and arranged to be connected to the transmission output shaft via a reverse drive clutch.

25. The drivetrain according to claim 1, characterized in that the first transmission output element and the second transmission output element are configured and arranged to be connected to the transmission output shaft via at least one clutch unit.

26. The drivetrain according to claim 1, further including at least one of a shiftable output transmission stage or a shiftable range stage is arranged between at least one of a shiftable transmission output element and the transmission output shaft.

* * * * *